United States Patent Office 3,487,703
Patented Jan. 6, 1970

3,487,703
SEALING FOR CRANKSHAFT
Rudolf M. Obendorfer, Perchtoldsdorf-Vienna, Austria, assignor to McKay Mannesmann-Meer, Youngstown, Ohio
Filed Mar. 11, 1968, Ser. No. 712,146
Claims priority, application Germany, Mar. 17, 1967, M 73,214
Int. Cl. F16h *21/22;* F16c *3/06*
U.S. Cl. 74—44
9 Claims

ABSTRACT OF THE DISCLOSURE

A system for sealing a crankshaft in a housing has a seal for each slot in the housing that passes a projecting connecting rod of the crankshaft. The seal includes a frame that adjoins the slot, a slide that moves in the frame substantially linearly, and a body journaled for rotational movement in the slide and surrounds and thereby guides the connecting rod.

---

The invention relates to sealing devices, and relates more particularly to sealing devices for crankshafts that are enclosed in a housing structure, to seal the slots through which the connecting rods of the crankshaft project. Still more particularly, the invention relates to a sealing system, for use in sealing a slot of a housing through which projects a connecting rod of a crankshaft surrounded by the housing, particularly in connection with a cold rolling mill of the "step-back" type also known as "pilger" cold rolling mill.

In the aforesaid "pilger" cold rolling mill, there are utilized driving means that include a crankshaft that is sealed in a housing. The crankshaft has one or more connecting rods, and each connecting rod projects through a slot, for instance a vertical slot of the housing to the exterior of the housing, towards the rolling frame, for driving the rolling frame.

This slot must be sealed against the passage, in either direction, of various substances, for instance against the entry into the housing of cooling fluids, and against the exit from the housing of lubricants that are applied to the bearing of the crankshaft.

Various efforts have been made in the past to promote the sealing of the housings described. For connecting rods of rectangular cross-section, the prior art has provided a sealing of the vertical housing slot in the form of a slide that is vertically movable together with the vertical movement components of the connecting rod.

Connecting rods have, however, become known that have round cross-sections. In the past, constructions have been provided for sealing such connecting rods with round cross-sections by sealing them all around the circumference of the crankshaft and suspending them in an elastic bellows. Furthermore, seals have become known in which the connecting rod is sealed throughout its length by means of a bellows.

It has furthermore been proposed in the past to simplify the sealing problem by driving the rolling frame by means of an intermediate cross head guide, thereby eliminating the vertical component of the movement of the connecting rod to be sealed.

All the aforesaid constructions and proposals for preventing the mixture between lubricants and coolants, however, are characterized by the drawback that the sealing is incomplete and leads to great wear. Furthermore, sealings of the aforesaid type are costly and lead to large dimensions of the moving part.

It is accordingly among the principal objects of the invention to avoid the aforesaid drawbacks of the prior art.

It is another object of the invention to provide for a sealing that reliably and satisfactorily prevents the mixing of the coolants and lubricants, and thereby reduces the consumption of both commodities.

It is a further object of the invention to provide a sealing of the foregoing type that avoids the need for a large dimensioning of the movable parts.

Further objects and advantages of the invention will be set forth in part in the following specification and in part will be obvious therefrom without being specifically referred to, the same being realized and attained as pointed out in the claims hereof.

Broadly speaking, the foregoing aims are achieved in accordance with the invention, preferably for connecting rods of rectangular cross-section; connecting rods of rectangular cross-section are preferred for the reason because they pemit a reduction of masses and hence permit an optimal rotational speed; the connecting rods project through an exit opening of the crankshaft housing. In accordance with the invention, these openings are sealed by means of a vertically movable slide that is guided in a frame, and which journals a body that has round surfaces, for instance of a spherical or a cylindrical type, which body surrounds and thereby guides the connecting rod; the body is so journaled in the slide that it is rotatable about an axis that is at right angles to the plane of movement of the connecting rod. Between the slide and the body, on one hand, and the body and the connecting rod, on the other hand, the sealing may be achieved by well-known conventional sealing means.

The instant invention offers the advantage that during the compound movement of the connecting rod there will be a continuous sealing of the exit opening for the connecting rod, so that all the surfaces that need to be sealed during the entire movement of the connecting rod are made so leak-tight that the mixing of the lubricants and the coolants is substantially precluded.

With the above and other objects of the invention in view, the invention consists in the novel construction, arrangement and combination of various devices, elements and parts, as set forth in the claims hereof, one embodiment of the same being illustrated in the accompanying drawings and described in the specification.

For a fuller understanding of the nature and objects of the invention, reference should be had to the following detailed description, taken in connection with the accompanying drawings, in which.

Figure 1:
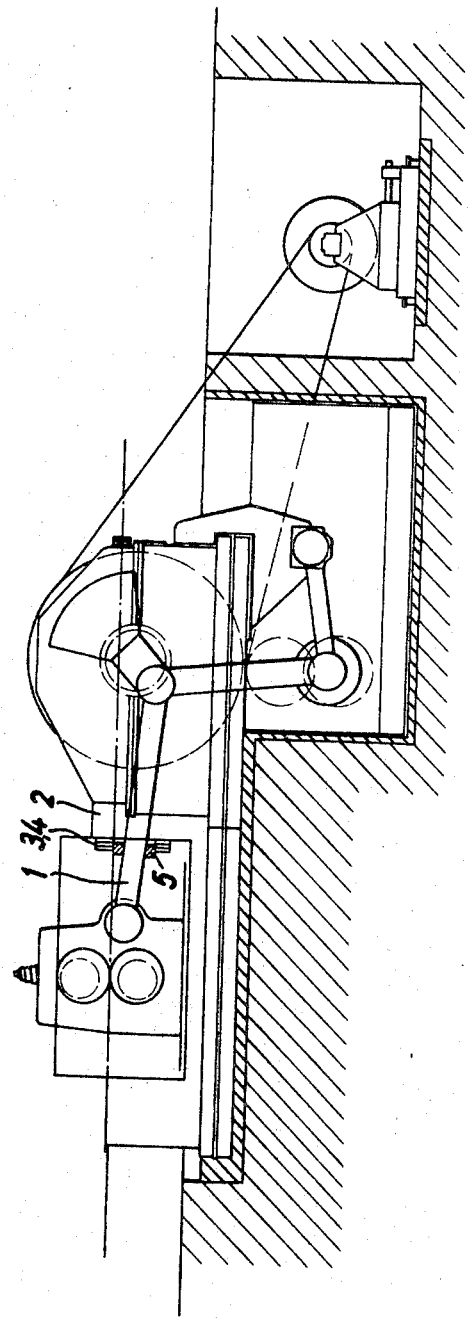
FIG. 1 is a side elevational view, partly in section, of a "pilger" cold rolling mill having a crankshaft drive.
Figure 2:
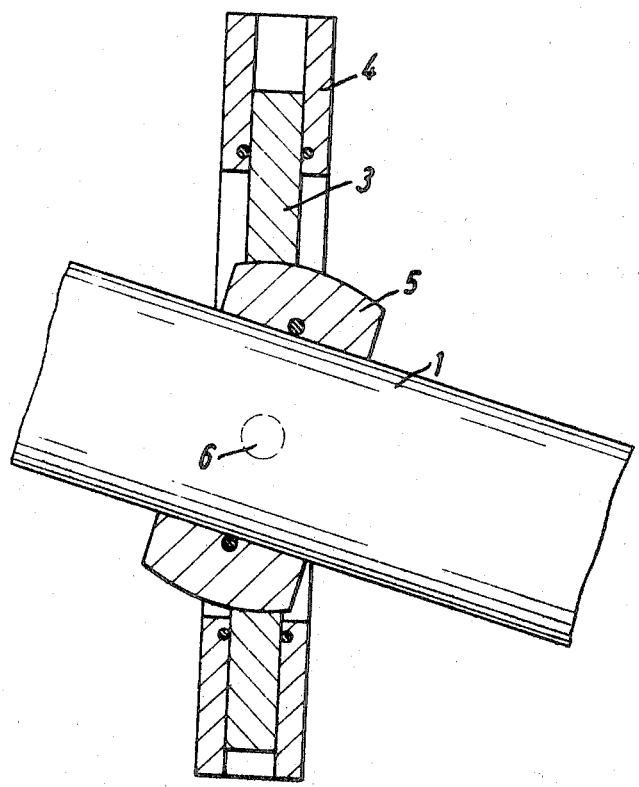
FIG. 2 is a large scale sectional view of a detail thereof that includes the frame and slide and body for the connecting rod.

The cold rolling mill of the "pilger" type of FIG. 1 includes a connecting rod 1 that projects from the housing 2 for the crankshaft. A slide 3 (FIGS. 2, 3) is vertically movable oppositely in a frame 4 that is connected to the housing 2. The slide 3 covers the opening in the housing 2 through which the connecting rod 1 projects.

Figure 3:
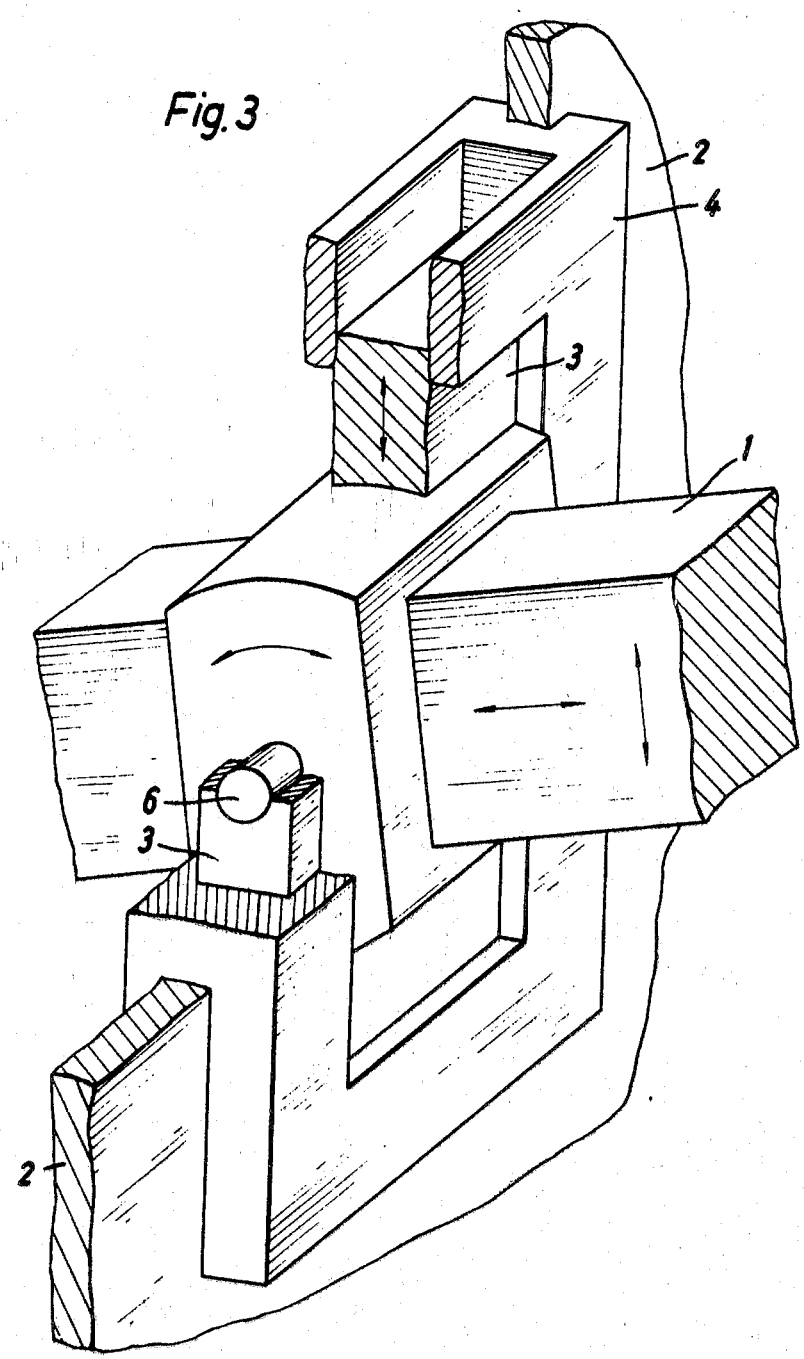
FIG. 3 is a large scale fragmentary perspective view of certain details including the details shown in FIG. 2.

A body 5 has round external surfaces, for instance of a spherical or cylindrical nature, that are in contact with corresponding round surfaces that are defined in the slide 3. The body 5 is journaled for rotational movement about the axis of axles 6 (of which only one is shown in FIG. 3).

Thus, the instant arrangement provides for sealing during the compound movement of the connecting rod 1. The compound movement has a longitudinal component relative to the direction of elongation of the connecting rod 1, and a vertical component. The slide 3 provides for the sealing of the vertical component of the movement of the connecting rod 1. The connecting rod 1, on the other hand, is guided for elongated movement in the body 5, and the body 5 thus provides for sealing of that component. Lastly, the round surfaces of the body 5 and of the slide 3, respectively, provide for sealing of the rocking result of the compound movement of the connecting rod 1.

As previously mentioned, these sealings between the round surfaces, between the body 5 and the connecting rod 1, and between the slide 3 and the frame 4, are carried out by conventional sealing means.

The round surfaces of the body 5 are convex, and the round surfaces of the slide 3 are concave, and the concave surfaces of the slide 3 match and engage the convex surfaces of the body 5. The convex and concave surfaces have a radius that extends at least from one point of the axis of the axles 6.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A sealing system, for use in sealing an opening of a housing through which there projects a connecting rod performing a compound movement substantially in one plane including a first movement in opposite first longitudinal directions and a second movement in opposite second directions and off-set from said first directions and including a component in certain opposite directions, said sealing system comprising a frame adapted to be disposed adjacent said opening, a slide guided in said frame for movement in substantially said certain directions, said slide defining concave surfaces, a body having convex surface portions matching and in contact with said concave surfaces of said slide, said body being rotatable about an axis adapted to be disposed perpendicularly to said one plane, said convex and concave surfaces being formed about at least one point of said axis, said body being adapted to surround said connecting rod thereby guiding it slidingly in said first directions.

2. A sealing system, as claimed in claim 1, and sealing means disposed between the surfaces of said slide and said frame, on one hand, and said body and said connecting rod on the other hand.

3. A sealing system, as claimed in claim 1, said connecting rod having rectangular cross-section, said body having a matching rectangular opening surrounding and guiding said connecting rod.

4. A sealing system, for use in sealing the openings of a crankshaft housing for a cold rolling mill of the "pilger" type through each of which openings there projects a connecting rod, said sealing system sealing each connecting rod in its opening as set forth in claim 1.

5. Apparatus wherein an elongated member extends from one environment to another and which environments must be sealed from each other and wherein said member has a compound movement formed of a first movement component in which said member reciprocates longitudinally, a second movement component in which said member rocks about a transverse axis, and a third movement component in which said member shifts bodily in a direction transversely of its axis, the improvement comprising:

a wall separating the environments aforesaid and having an aperture through which said member projects,
  a body at such wall aperture in encircling, close-fitting engagement with said member to prevent fluid passage therebetween and within which said member is slidable during londitudinal movement thereof,
  and a slide in encircling, close-fitting engagement with said body to prevent fluid loss therebetween and within which said body moves with said member during rocking movement thereof,
  said slide closing the aperature in said wall and having close sliding engagement with said wall to prevent fluid loss therebetween and said slide moving with said member during bodily shifting member movement.

6. The construction of claim 5 wherein said body is unitarily movable with said member during both rocking and bodily shifting member movement,
  and wherein said slide is unitarily movable with said body and said member during bodily shifting member movement.

7. The construction of claim 5 wherein at least one of said slide and said body has an arcuate surface concentric with the axis about which said member rocks.

8. The construction of claim 7 wherein said body has pivot connection with said slide to provide for rocking movement of said body with said member upon rocking movement of the latter.

9. The construction of claim 7 wherein said slide is disposed between and is slidable along opposed surfaces carried by said wall.

References Cited

UNITED STATES PATENTS

| 3,031,215 | 4/1962 | Vance | 287—3 |
| 3,066,805 | 12/1962 | Sullivan | 214—1 |
| 3,291,321 | 12/1966 | Hamilton | 214—1 |
| 192,449 | 6/1877 | Morgan | 74—44 |

FOREIGN PATENTS 680,075  10/1952  Great Britain.

FRED C. MATTERN, Jr., Primary Examiner

W. S. RATLIFF, Jr., Assistant Examiner

U.S. Cl. X.R.

287—3